United States Patent
Matsubara et al.

(10) Patent No.: US 7,986,862 B2
(45) Date of Patent: Jul. 26, 2011

(54) OPTICAL TRANSMISSION SUBSTRATE, METHOD FOR FABRICATING THE SAME, AND OPTOELECTRONIC HYBRID SUBSTRATE

(75) Inventors: Takahiro Matsubara, Kyoto (JP); Yuuji Kishida, Kyoto (JP)

(73) Assignee: Kyocera Corporation, Kyoto (JP)

( * ) Notice: Subject to any disclaimer, the term of this patent is extended or adjusted under 35 U.S.C. 154(b) by 178 days.

(21) Appl. No.: 12/295,453

(22) PCT Filed: Mar. 30, 2007

(86) PCT No.: PCT/JP2007/057033
§ 371 (c)(1),
(2), (4) Date: Feb. 6, 2009

(87) PCT Pub. No.: WO2007/114316
PCT Pub. Date: Oct. 11, 2007

(65) Prior Publication Data
US 2009/0310904 A1 Dec. 17, 2009

(30) Foreign Application Priority Data
Mar. 30, 2006 (JP) .................... 2006-093078

(51) Int. Cl.
*G02B 6/26* (2006.01)
*G02B 6/42* (2006.01)
(52) U.S. Cl. .......................... 385/47; 385/88
(58) Field of Classification Search .................. None
See application file for complete search history.

(56) References Cited

U.S. PATENT DOCUMENTS

| 6,810,160 B2 | 10/2004 | Sugama et al. |
| 7,077,577 B2 * | 7/2006 | Trezza et al. ............... 385/63 |
| 2002/0118907 A1 | 8/2002 | Sugama et al. |
| 2007/0297729 A1 * | 12/2007 | Kodama et al. ............ 385/94 |

FOREIGN PATENT DOCUMENTS

| JP | 04225302 A | 8/1992 |
| JP | 09127360 A | 5/1997 |
| JP | 2002258081 A | 9/2002 |
| JP | 2003050329 A | 2/2003 |
| JP | 2004054003 A | 2/2004 |
| JP | 2004279687 A | 10/2004 |

OTHER PUBLICATIONS

International Search Report for corresponding PCT application PCT/JP2007/057033 lists the references above.

* cited by examiner

*Primary Examiner* — Jerry T Rahll
(74) *Attorney, Agent, or Firm* — DLA Piper LLP (US)

(57) ABSTRACT

An optical transmission substrate includes an optical transmission body provided in a through hole which has excellent and uniform propagation characteristics. The optical transmission substrate includes: a substrate 1 formed by laminating a plurality of dielectric sheets 10; and a plurality of cylindrical refractive-index distribution bodies 11, each of which is made of a photosensitive polymeric material formed in a through hole 10a penetrating each of the dielectric sheets, each of the refractive-index distribution body including a truncated conical core 12 and a periphery. Each of the cores 12 has a higher refractive index in the radial direction than the periphery and has a large-diameter end face and a small-diameter end face. The cores of refractive-index distribution bodies have a first core and a second core in the two adjoining dielectric sheet, and, the large-diameter end face of the first core and the small-diameter end face of the second core face each other and optically couple together.

13 Claims, 9 Drawing Sheets

1 : Optical transmission substrate
2 : Substrate
2a, 2b : Surfaces of substrate
3 : Optical transmission body
10A, 10B : Dielectric sheets
10A1, 10B1 : Through holes
11A, 11B : Refractive-index distribution bodies
12A, 12B : Cores
12A1, 12B1 : Large-diameter end face
12A2, 12B2 : Small-diameter end face
13A, 13B : Peripheries “OPTICAL TRANSMISSION SUBSTRATE, METHOD FOR FABRICATING THE SAME, AND OPTOELECTRONIC HYBRID SUBSTRATE”

BACKGROUND OF THE INVENTION

1. Field of the Invention

The present invention relates to an optical transmission substrate employed for optical interconnection or the like, and a method for fabricating the same, and particularly, an optical transmission substrate which includes an optical transmission body provided in a through hole having excellent and uniform transmission characteristics. The present invention also relates to an optoelectronic hybrid substrate provided with the optical transmission substrate.

2. Description of the Background Art

The operation speed and number of electric-signal I/O terminals of a semiconductor device will continue to rise for the purpose of raising throughput and processing speed in information processing. At the same time, the number of signal lines in a circuit substrate for mounting such a semiconductor device tends to significantly increase and the electric line density will also rise. This causes the serious problem of sharply increasing signal damping in electric line formed in a mounting substrate and crosstalk between adjacent lines. Especially in a large-scale semiconductor integrated circuit mainly including a microprocessor, a GHz-level signal needs inputting and outputting stably with a low power consumption.

In order to solve the problems, the optical transmission art has been studied of converting an electric signal inputted in and outputted to a semiconductor device into an optical signal and transmitting light corresponding to the optical signal through optical line such as an optical waveguide formed in a mounting substrate.

In a photoelectric conversion section converting an electric signal into an optical signal, a light-emitting optical semiconductor device such as a semiconductor laser (LD) and a light-emitting diode (LED) mainly made of a compound semiconductor is used on a transmission-output side while a light-receiving optical semiconductor device such as a photo-diode (PD) made of a silicon (Si) or a compound semiconductor is used on a reception-input side.

Among various semiconductor lasers, a surface emitting laser (VCSEL) allowing a light-emitting section to emit light perpendicularly to the main surface of a device substrate has been recently widely employed as a high-performance and low-cost transmission light source. This is because the surface emitting laser is capable of obtaining an excellent crystal on a crystal growth plane thereof. As a photo-diode alike, a surface-receiving type having a light-receiving section arranged on a crystal plane thereof has been generally employed.

Conventionally, an optical transmission substrate is known which includes an optical waveguide formed by covering a core made of a high refractive-index material with a clad made of a low refractive-index material as optical line parallel to the substrate surface on or inside of the substrate. The optical waveguide is formed by an optical glass or a single-crystal or polymeric optical material.

In addition, a conventional optoelectronic hybrid substrate hybridizing optical line and electric line is known which has an optical-coupling structure of the above optical semiconductor device and optical waveguide. In the optoelectronic hybrid substrate, the I/O direction of signal light is almost perpendicular to the optical waveguide formed on a mounting substrate, thereby presenting various proposals for obtaining a greater coupling light quantity.

FIG. 10 is a sectional view showing a typical example of a conventional optical transmission substrate having an optical waveguide and an example of an optical-electric circuit substrate disclosed in Japanese Patent Laid-Open Publication No. 2003-50329. In the example of FIG. 10, an optical line layer (optical waveguide) 103 and electric line 105 are formed on a substrate 100. As shown by a broken line in the figure, signal light emitted from a laser diode 101 on the transmission side: is incident vertically upon an upper clad 103b forming a part of the optical line layer 103 and enters into a lower clad 103c through a core pattern (core) 103a, and then the signal light turns the propagation direction to the line direction along the optical line layer 103 at a mirror member 104 arranged in the optical line layer 103; and is incident upon the core pattern 103a of the optical line layer 103.

Likewise on the reception side, the signal light propagating through the core pattern 103a of the optical line layer 103 reaches the lower clad 103c once, turns upward vertically to the optical line layer 103 at the mirror member 104, and similarly, is incident upon a photo-diode 102 through the core pattern 103a and the upper clad 103b.

Furthermore, Japanese Patent Laid-Open Publication No. 2004-54003 discloses an example of a conventional optical transmission substrate in which a short optical fiber as an optical waveguide is embedded in a through hole formed in a plurality of laminated dielectric layers.

Moreover, Japanese Patent Laid-Open Publication No. 2004-279687 discloses an example of a conventional optical transmission substrate and optoelectronic hybrid substrate including a plurality of laminated dielectric layers provided with an optical waveguide formed in a through hole.

However, the configuration of Japanese Patent Laid-Open Publication No. 2003-50329 shown in FIG. 10 has the problem of making harder in efficiently coupling the surface-type optical semiconductor device of the laser diode 101 and the photo-diode 102 optically with the optical waveguide of the optical line layer 103. Specifically, signal light emitted from the laser diode 101 widens by a half-value total angle of tens degrees into a spot size several or more times as large as that at the emission point when reaching the mirror member 104 through the optical line layer 103.

Even after undergoing an optical-path conversion at the mirror member 104, the signal light radiates while propagating through the lower clad 103c covering the reflection plane, thereby making the spot size of the optical signal several to tens times as large as that at the emission point when reaching the core pattern 103a of the optical line layer 103, far larger than the core pattern 103a having a cross-section size of tens-μm angle.

This hinders the signal light from being efficiently incident upon the core pattern 103a and thus lowers the signal-light transmission level in the optical line layer 103, thereby causing the problem of making harder in raising the signal-to-noise ratio (S/N ratio) or the dynamic range of signal modulation.

In order to solve the problem, the signal-light transmission level needs to be raised, and thus, the electric current injected into the laser diode 101 needs increasing to heighten the light output. However, this leads to an increase in the power consumption of the laser diode 101, thereby lowering the energy efficiency of signal transmission.

At the same time, the increased electric current injected into the laser diode 101 generates more heat in the laser diode 101, thereby requiring an additional complex radiation structure and deteriorating the reliability. Besides, heat radiated from the substrate 100 may adversely affect the operation of a system provided with the optical-electric circuit substrate.

In addition, the optical transmission substrate disclosed in Japanese Patent Laid-Open Publication No. 2004-54003 includes the short optical fiber embedded in the through hole, thereby excessively increasing the process-hour for the optical transmission substrate provided practically with a great deal of optical line and thus worsening the mass productivity. Instead of embedding the short optical fiber in the through hole, another method is known of directly forming an optical transmission body shaped like an optical waveguide in a through hole. This method also has the problem of making harder in forming an optical transmission body having a uniform structure in the optical transmission direction in a thicker optical transmission substrate, thereby causing a greater optical-transmission loss.

Furthermore, in the optical transmission substrate disclosed in Japanese Patent Laid-Open Publication No. 2004-279687, in forming the optical waveguide in each through hole of the plurality of laminated dielectric layers, a continuous core is formed over the whole laminated layers by applying a writing beam from between each dielectric layer after laminating the dielectric layers. In this case, a generally-narrow optical-coupling-efficiency tolerance to a shift in the connection part of each optical waveguide formed in each through hole of the layers may cause a greater optical-transmission loss from a shift in adjacent optical waveguides through a subsequent fabrication process or the like. Besides, the optical transmission substrate cannot be applied to a design created by deliberately shifting the optical waveguides of adjacent layers.

SUMMARY OF THE INVENTION

In view of the problems of the conventional arts, it is an object of the present invention to provide an optical transmission substrate which includes an optical transmission body provided in a through hole having excellent and uniform propagation characteristics regardless of thickness of the substrate, a method for fabricating the same and an optoelectronic hybrid substrate provided therewith.

An optical transmission substrate according to one of the present invention includes: a substrate formed by laminating a plurality of dielectric sheets; and a plurality of cylindrical refractive-index distribution bodies, each of which is made of a photosensitive polymeric material formed in a through hole penetrating each of the plurality of dielectric sheets. Each of the refractive-index distribution body includes a truncated conical core and a periphery. The core has a higher refractive index in the radial direction than the periphery and has a large-diameter end face and a small-diameter end face. The refractive-index distribution body has a first core and a second core in two adjoining sheets, and the large-diameter end face of the first core and the small-diameter end face of the second core face each other and optically couple together.

In the optical transmission substrate, the refractive index may change stepwise on the boundary between the core and the periphery in the radial direction.

Furthermore, in the optical transmission substrate, the refractive index in the core gradually may lower concentrically outward in the radial direction from the center.

Moreover, the optical transmission substrate further may include concaves in an end part of, the refractive-index distribution body. The concave recedes into the through hole from the opening edge of the through hole, and a translucent member is in the through hole.

In addition, the optical transmission substrate further may include an optical waveguide formed on one surface of the substrate, the optical waveguide being optically coupled with the core of the refractive-index distribution body in the dielectric sheet forming the one surface.

An optical-transmission substrate fabrication method according to one of the present invention includes: filling a through hole formed in a dielectric sheet with a photosensitive polymeric material; forming a truncated conical core in the photosensitive polymeric material to form a cylindrical refractive-index distribution body, the truncated conical core having a higher refractive index in the radial direction than the periphery; and laminating a plurality of the dielectric sheets, each of which has the refractive-index distribution body formed therein.

Furthermore, the optical-transmission substrate fabrication method further may include: forming a concave in an end part of the photosensitive polymeric material filled into the through hole; and filling the concave with a photosensitive polymeric material after forming the refractive-index distribution body.

An optoelectronic hybrid substrate according to a first aspect of the present invention includes: the optical transmission substrate according to any of the above; a first conductor pattern formed on a first surface of the optical transmission substrate; a second conductor pattern formed on a second surface of the optical transmission substrate; a penetrating conductor penetrating the substrate and connecting the first conductor pattern and the second conductor pattern; an optical semiconductor device electrically connected to the first conductor pattern on the first surface; and an optical waveguide formed on the second surface, in which: the core of the refractive-index distribution body in the dielectric sheet forming the first surface is optically coupled onto the optical semiconductor device; and the core of the refractive-index distribution body in the dielectric sheet forming the second surface is optically coupled onto the optical waveguide.

An optoelectronic hybrid substrate according to a second aspect of the present invention includes: a two-layer substrate of the optical transmission substrate according to any of the above and a second substrate; and a first conductor pattern formed on a first surface of the optical transmission substrate in the two-layer substrate, a second conductor pattern formed on a first surface of the second substrate in the two-layer substrate, a penetrating conductor penetrating the two-layer substrate and connecting the first conductor pattern and the second conductor pattern, an optical semiconductor device electrically connected to the first conductor pattern on the first surface of the optical transmission substrate, and an optical waveguide formed between the optical transmission substrate and the second substrate. The core of the refractive-index distribution body in the dielectric sheet forming the first surface of the optical transmission substrate in the two-layer substrate is optically coupled onto the optical semiconductor device; and the core of the refractive-index distribution body in the dielectric sheet forming a second surface of the optical transmission substrate on which the optical waveguide is formed is optically coupled onto the optical waveguide.

A composite optical transmission substrate according to one of the present invention includes: the optical transmission substrate according to any of the above; a second substrate parallel to the optical transmission substrate; and an optical waveguide formed on the surface of the second substrate facing the optical transmission substrate, in which the core of the refractive-index distribution body in the dielectric sheet of the optical transmission substrate facing the second substrate is optically coupled onto the optical waveguide.

Advantages

In the optical transmission substrate according to one of the present invention, the cylindrical refractive-index distribution body is provided in the through hole of each dielectric sheet of the substrate formed by laminating the plurality of dielectric sheets; and the core of the refractive-index distribution body is shaped like a truncated cone having a higher refractive index than the periphery and having a large-diameter end face and a small-diameter end face. In addition, the cores of refractive-index distribution bodies have a first core and a second core, the large-diameter end face of the first core and the small-diameter end face of the second core face each other and optically couple together in two adjoining layers of the refractive-index distribution body. This configuration allows signal light to propagate inside the core, thereby extremely lessening the propagation loss.

In addition, adjacent cores optically couple together at the small-diameter end face of the first core and the large-diameter end face of the second core which is different from the first core in size. Therefore, even if the first core shifts to some extent from the second core, the small-diameter end face is highly likely to stay within the periphery of the large-diameter end face, thereby widening the tolerance to a positional shift in the cores at the connection part of each refractive-index distribution body, so that the optical-coupling dispersion can be reduced at each connection part. Accordingly, propagation loss can be suppressed even if the cores shift from each other at the connection part, and propagation characteristics of several connected refractive-index distribution bodies are permitted to be uniform as a whole. In contrast, in the case where cores having the same end-face size optically couple together, any slight shift significantly varies the contact area of both end faces, thereby affecting the optically coupling and widening the optical-coupling dispersion at each connection part.

Furthermore, since adjoining cores optically couple together at the small-diameter end face and the large-diameter end face, the refractive-index distribution body of each dielectric sheet can be shifted little by little toward the inside of the substrate surface, thereby realizing optical line oblique from the direction perpendicular to the substrate inside of the substrate. The oblique optical line makes it possible to shift the refractive-index distribution body in each dielectric sheet appropriately according to an incidence direction upon the substrate or an emission direction from the substrate, for example, in such a way that light propagates at an angle as close as possible to the incidence direction or the emission direction, thereby further reducing the propagation loss at the light incidence or emission part.

As described above, according to one of the present invention, an optical transmission substrate having excellent propagation characteristics can be obtained regardless of the substrate thickness, and a plurality of fabricated optical transmission substrates having uniform propagation characteristics is provided.

Furthermore, in the refractive-index distribution body of the optical transmission substrate according to one of the present invention, the refractive index changes stepwise on the boundary between the core and the periphery in the radial direction, thereby allowing signal light to reflect on the refractive-index boundary and propagate inside a higher refractive-index central area. This realizes more efficient signal-light propagation than the case of a refractive-index distribution body having a uniform refractive index.

Moreover, in the refractive-index distribution body of the optical transmission substrate according to one of the present invention, the refractive index in the core gradually lowers concentrically outward in the radial direction from the center, thereby allowing signal light to zigzag in a central area of the refractive-index distribution body and propagate inside there. As a result, the signal light can be propagated in a wider band.

In addition, in the optical transmission substrate according to one of the present invention, the refractive-index distribution body includes the concave formed in the end part and the translucent member is formed in the concave, thereby leaving a space between end faces of the cores of adjacent refractive-index distribution bodies so that the tolerance to a positional shift in these cores can be further relaxed, and suppressing a reflection of signal light by the end faces of each core because the translucent member is filled between the end faces of the cores. This makes it possible to further suppress propagation loss and unify propagation characteristics of several connected refractive-index distribution bodies as a whole.

Furthermore, the optical transmission substrate according to one of the present invention further includes the optical waveguide formed on one surface of the substrate and this optical waveguide is optically coupled with the core of the refractive-index distribution body in the outermost dielectric sheet forming the one surface. The optical transmission body formed by connecting the plurality of refractive-index distribution bodies in the dielectric sheets allows the one surface and the another surface of the substrate to optically couple together in such a way that it has excellent and uniform propagation characteristics.

Moreover, the optical-transmission substrate fabrication method according to one of the present invention includes: filling the through hole formed in the dielectric sheet with a photosensitive polymeric material; forming a truncated conical core in the photosensitive polymeric material to form a cylindrical refractive-index distribution body, the truncated conical core having a higher refractive index than that on the periphery; and laminating a plurality of the dielectric sheets, each of which has the refractive-index distribution body formed therein. Therefore, in forming the optical transmission substrate having a predetermined thickness, the optical transmission body can be formed by setting a suitable layer number, determining the thickness of a single dielectric sheet and applying the same processing to each dielectric sheet. The plurality of dielectric sheets having uniform characteristics are laminated to connect the several refractive-index distribution bodies over the whole substrate, thereby forming the optical transmission body having uniform propagation characteristics. At this time, the core of the refractive-index distribution body has different diameters at the upper and lower ends, thereby making the diameter of the first core of adjoining refractive-index distribution bodies wider than that of the second core. Accordingly, even if a dielectric sheet is laminated with shifting from a predetermined position, the other end face having a wider diameter than one end face of the adjoining cores relaxes the optical-coupling tolerance to the positional shift, thereby suppressing a propagation loss of signal light. This makes it possible to fabricate the optical transmission substrate sustaining less propagation loss and having uniform propagation characteristics among such sheets.

In addition, the optical-transmission substrate fabrication method according to one of the present invention further includes forming a concave in an end part of the photosensitive polymeric material filled into the through hole and filling the concave with a translucent member after forming the refractive-index distribution body. Therefore, the translucent member of the concave formed in the end part relaxes the optical-coupling tolerance to a positional shift in the laminated dielectric sheets, suppresses a reflection of signal light by an end face of a core and keeps the unstable concave shape from making the optical characteristics uneven, thereby suppressing a propagation loss of signal light and stabilizing signal-light propagation characteristics. This makes it possible to fabricate the optical transmission substrate sustaining far less propagation loss and having further uniform propagation characteristics among such sheets.

Furthermore, the optoelectronic hybrid substrate according to one of the present invention includes: conductor patterns formed on both of a first and a second surfaces of the optical transmission substrate; a penetrating conductor through the substrate, connecting the conductor patterns on each substrate surface; an optical semiconductor device electrically connected to the conductor pattern on the first surface; and an optical waveguide formed on the second surface, in which: the core of the refractive-index distribution body in the outermost dielectric sheet forming the first surface is optically coupled onto the optical semiconductor device; and the core of the refractive-index distribution body in the outermost dielectric sheet forming the second surface is optically coupled onto the optical waveguide. This makes it possible to transmit light excellently while sustaining only a small propagation loss between the optical semiconductor device and the optical waveguide arranged on each surface.

Moreover, the optoelectronic hybrid substrate according to one of the present invention includes: conductor patterns formed on both surfaces of a two-layer substrate of the optical transmission substrate and a second substrate; a penetrating conductor through the substrate, connecting the conductor patterns on each substrate surface; an optical semiconductor device electrically connected to the conductor pattern on the first surface; and an optical waveguide formed between the layers. The core of the refractive-index distribution body in the outermost dielectric sheet of the two-layer substrate on the side of the optical transmission substrate is optically coupled onto the optical semiconductor device; and the core of the refractive-index distribution body in the outermost dielectric sheet of the optical transmission substrate on the side of the optical waveguide is optically coupled onto the optical waveguide. This makes it possible to transmit light excellently while sustaining only a small propagation loss between the optical semiconductor device and the optical waveguide.

In addition, in the optoelectronic hybrid substrate, signal light propagates through the optical waveguide between a light-emitting optical semiconductor device and a light-receiving optical semiconductor device, thereby improving the reception level on the reception side and thus obtaining excellent information access at high speed and at a low error rate between the optical semiconductor devices, or suppressing the transmission level on the transmission side, reducing the electric current for driving the optical semiconductor device to generate less heat and thus enhancing the reliability.

Furthermore, the composite optical transmission substrate according to one of the present invention includes: the optical transmission substrate according to any of the above; a second substrate parallel thereto; and an optical waveguide formed on the surface of the second substrate facing the optical transmission substrate, in which the core of the refractive-index distribution body in the dielectric sheet of the optical transmission substrate facing the second substrate is optically coupled onto the optical waveguide, thereby reducing the transmission loss in light propagation between the optical transmission substrate and the separate second substrate and thus offering excellent propagation characteristics.

DESCRIPTION OF THE PREFERRED EMBODIMENTS

An optical transmission substrate, a method for fabricating the same and an optoelectronic hybrid substrate according to one embodiment of the present invention is below described in detail with reference to the drawings.

Figure 1:
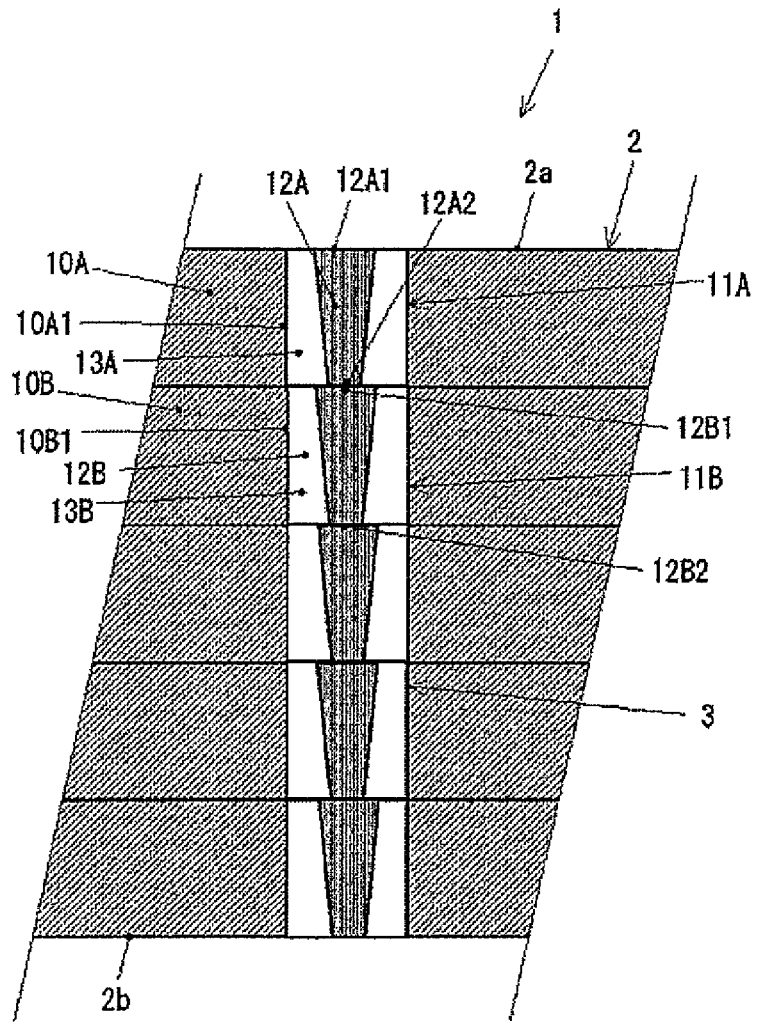
FIG. 1 is a schematic sectional view showing the main part of an exemplary optical transmission substrate according to one embodiment of the present invention.
Figure 2:
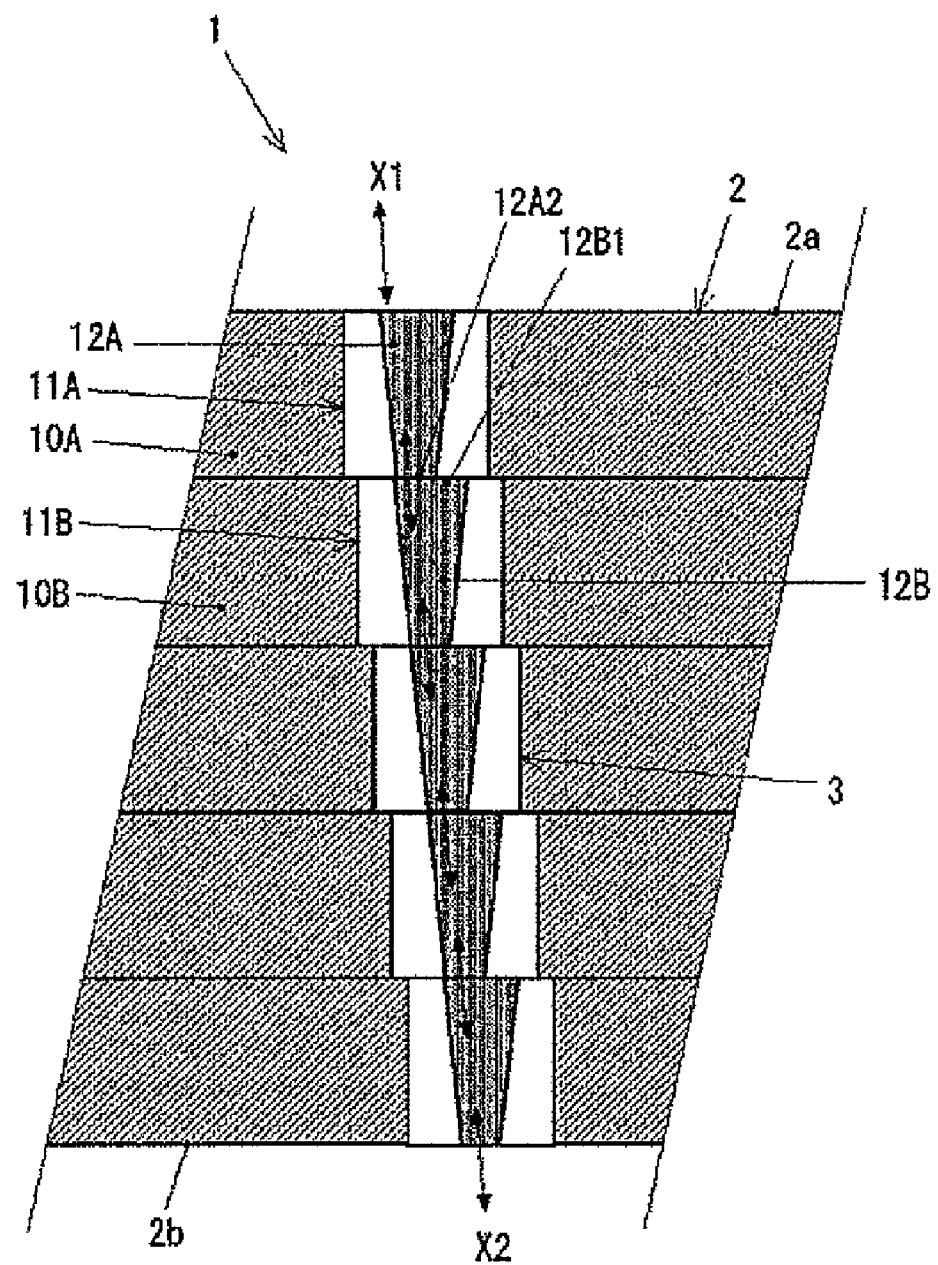
FIG. 2 is a schematic sectional view showing the main part of another exemplary optical transmission substrate according to one embodiment of the present invention.
Figure 4A:
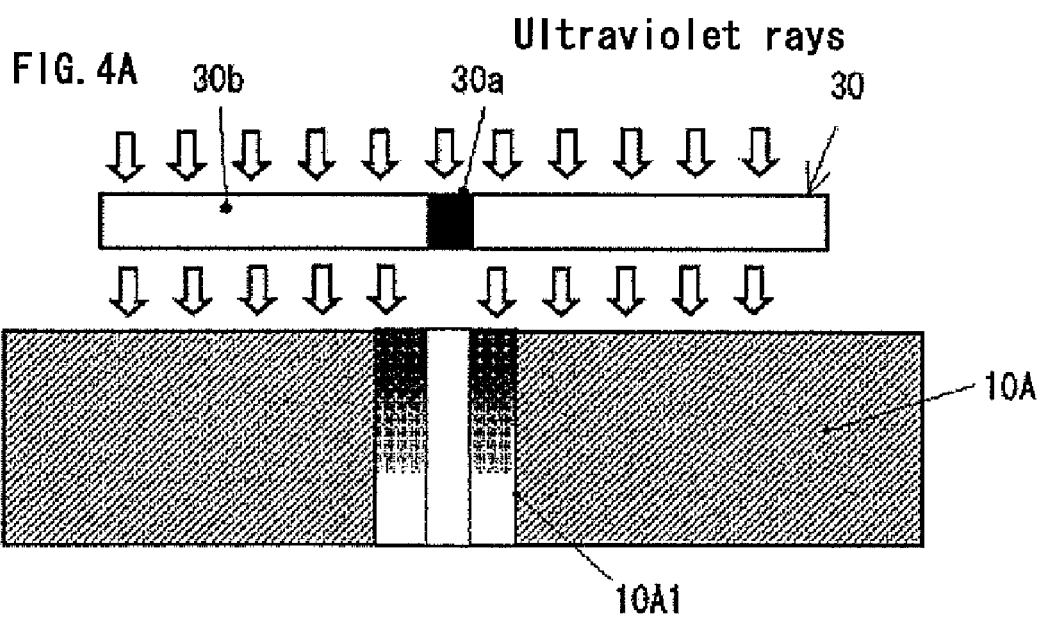
FIGS. 4A to 4B are sectional views detailing the main part in exposure and development processes, respectively, of the processes for fabricating the optical transmission substrate shown in FIG. 3.
Figure 4B:
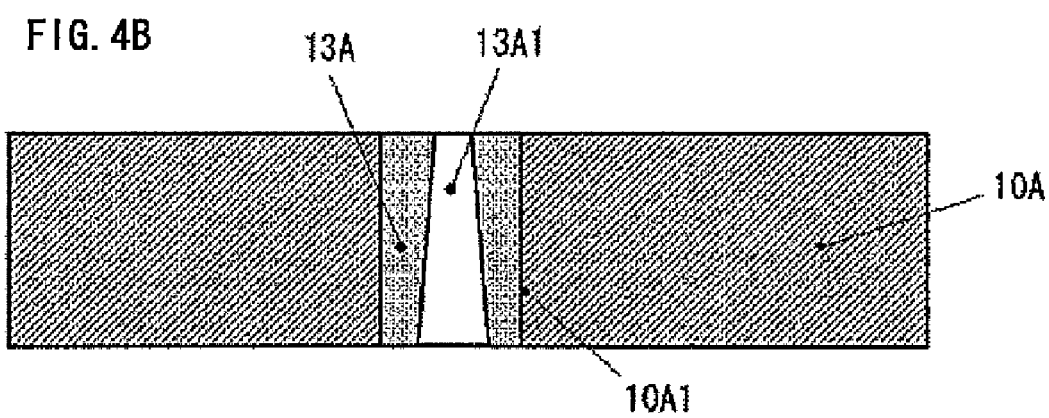
Figure 5:
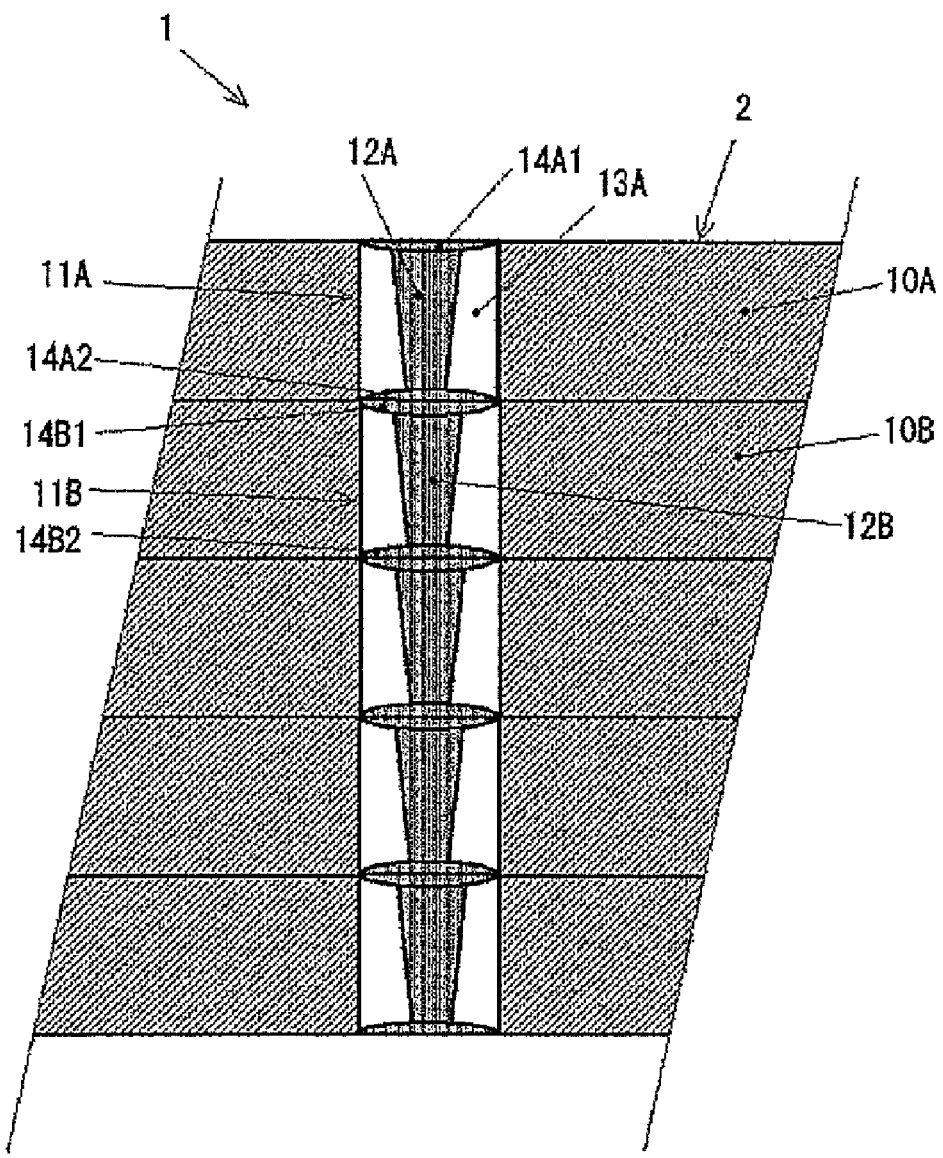
FIG. 5 is a schematic sectional view showing the main part of another exemplary optical transmission substrate according to one embodiment of the present invention.
Figure 6:
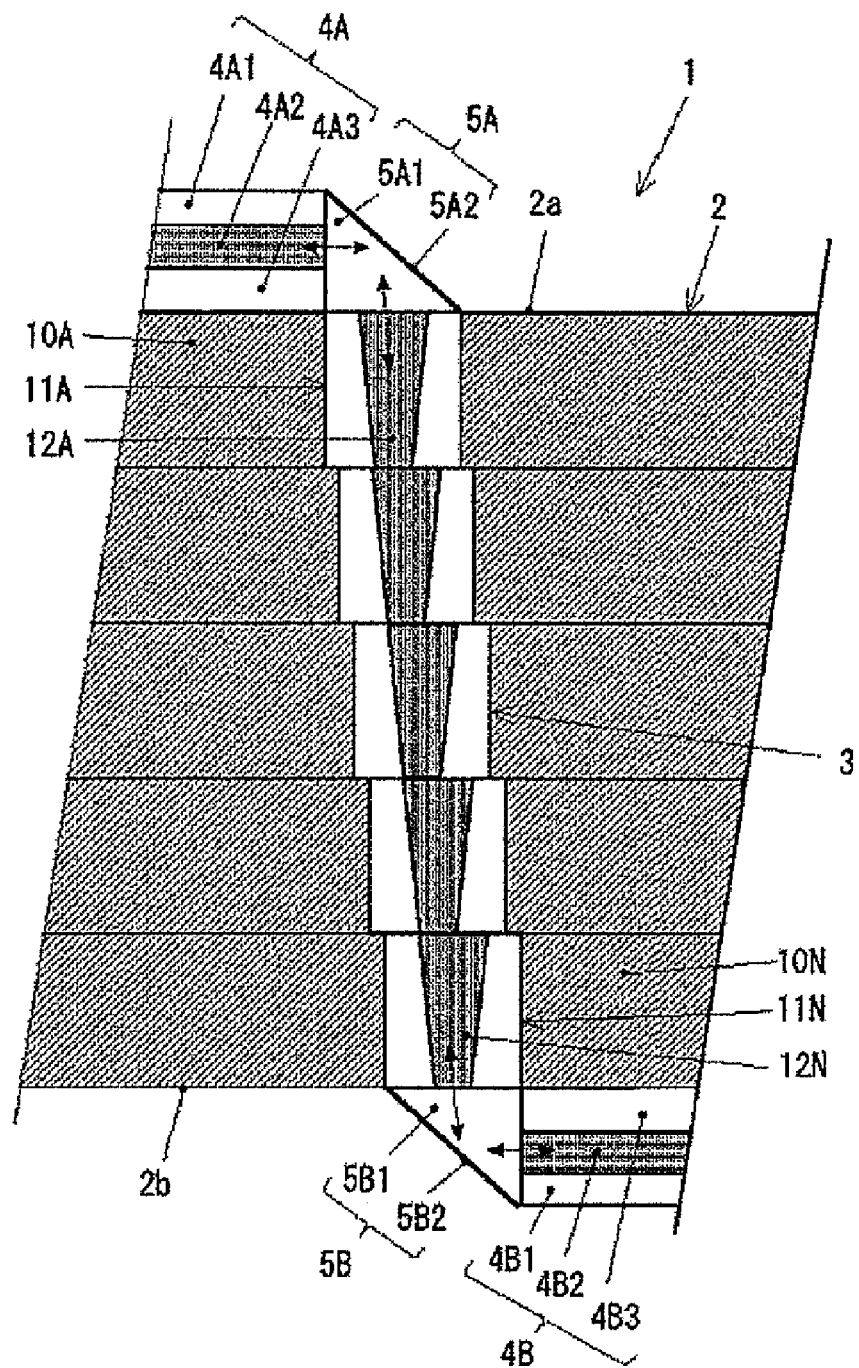
FIG. 6 is a schematic sectional view showing the main part of another exemplary optical transmission substrate according to one embodiment of the present invention.
Figure 7:
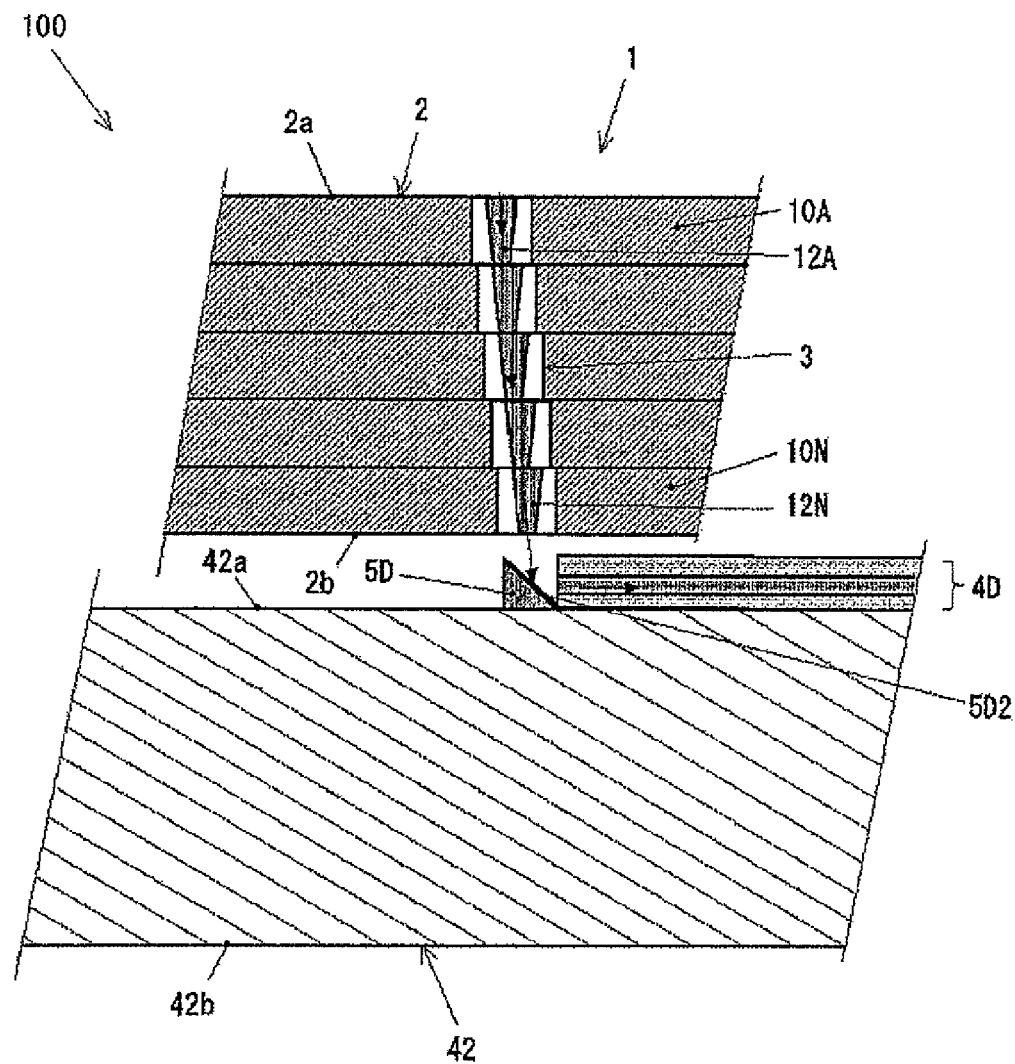
FIG. 7 is a schematic sectional view showing the main part of an exemplary composite optical transmission substrate according to one embodiment of the present invention.
Figure 8:
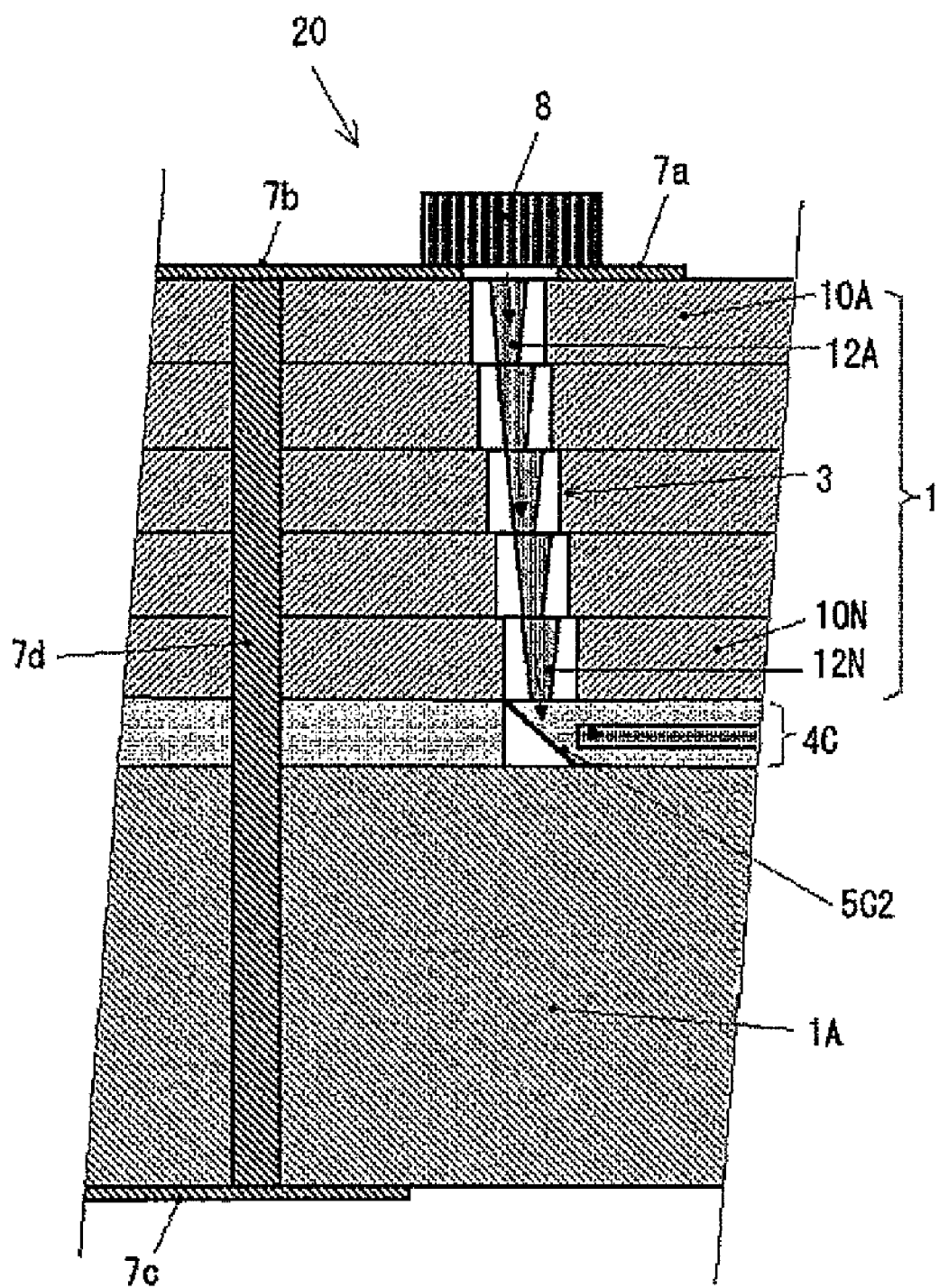
FIG. 8 is a schematic sectional view showing the main part of an exemplary optoelectronic hybrid substrate according to one embodiment of the present invention.

FIGS. 1 and 2 are schematic sectional views showing the main part of an exemplary optical transmission substrate according to one embodiment of the present invention and another exemplary optical transmission substrate, respectively. FIGS. 3A to 3E are schematic sectional views showing the main part in each process of an exemplary method for fabricating the optical transmission substrate shown in FIG. 1 or 2 according to one embodiment of the present invention FIGS. 4A to 4B are sectional views detailing the main part in exposure and development processes, respectively, of the processes for fabricating the optical transmission substrate shown in FIG. 3. FIG. 5 is a schematic sectional view showing the main part of another exemplary optical transmission substrate according to one embodiment of the present invention. FIG. 6 is a schematic sectional view showing the main part of another exemplary optical transmission substrate according to one embodiment of the present invention. FIG. 7 is a schematic sectional view showing the main part of an exemplary optoelectronic hybrid substrate according to one embodiment of the present invention. FIG. 8 is a schematic sectional view showing the main part of another exemplary optoelectronic hybrid substrate according to one embodiment of the present invention.

In FIGS. 1 to 7, reference numeral 1 denotes an optical transmission substrate; 2 denotes a substrate in the optical transmission substrate; 2a and 2b denote one surface and the other surface of the substrate, respectively; 10A, 10B and 10N denote dielectric sheets constituting the substrate; 11A, 11B and 11N denote refractive-index distribution bodies in the dielectric sheets; 12A, 12B and 12N denote the cores of the refractive-index distribution bodies; 13A and 13B denote the peripheries of the refractive-index distribution bodies; 13A1 denotes a first photosensitive polymeric material; 13A2 denotes a through hole formed in the first photosensitive polymeric material; 14A1, 14A2, 14B1 and 14B2 denote translucent members in the concaves of the refractive-index distribution bodies; 3 denotes an optical transmission body formed by connecting each refractive-index distribution body; 4A, 4B and 4C denote optical waveguides on the surfaces of the substrate; 4A1, 4A3, 4B1 and 4B3 denote clads of the optical waveguides; 4A2 and 4B2 denote cores of the optical waveguides; 5A and 5B denote optical-path converters on the substrate surfaces; 5A1 and 5B1 denote bases of the optical-path converters; 5A2 and 5B2 denote reflection planes (optical-path conversion planes) of the optical-path converters; 7a, 7b and 7c denote conductor patterns on the substrate surfaces; 7d denotes a penetrating conductor penetrating the substrate; 8 denotes an optical semiconductor device; 30 denotes a photo mask; 30a denotes a light shielding section; and 30b denotes a light transmission section.

The exemplary optical transmission substrate according to one embodiment of the present invention shown in FIG. 1 includes the substrate 2 formed by laminating a plurality of dielectric sheets including dielectric sheets 10A and 10B. The adjoining dielectric sheets 10A and 10B is below illustrated. The dielectric sheet 10A includes a through hole 10A1 penetrating through between both surfaces of the dielectric sheet 10A and the cylindrical refractive-index distribution body 11A made of a photosensitive polymeric material in the through hole 10A1. The refractive-index distribution body 11A includes the core 12A around the center axis and the periphery 13A around the core 12A in a concentric pattern, and the core 12A has a higher refractive index in the radial direction than that on the periphery 13A. As shown in the figure, the core 12A has a truncated-cone shape in section tapering off in the axial direction and has a large-diameter end face 12A1 larger in width (diameter) and a small-diameter end face 12A2 smaller in width. Such large-diameter end face and small-diameter end face may have a minimum width difference from each other for obtaining the advantages of the present invention. Further, the whole refractive-index distribution body 11A may not be a truncated cone having a geometrically-precise axial symmetry.

The refractive-index distribution body 11A has a refractive-index distribution in which a refractive index is concentrically high around the center and low on the periphery to the center thereby propagates signal light along the center axis while shutting it into the core. As an example, there is a stepwise refractive-index distribution body having a stepwise refractive index on the boundary between the core and the periphery: a higher refractive index in the core, for example, by several percent than on the periphery. A gradient refractive-index distribution body is also known where the refractive index of the core lowers gradually from the center axis toward the periphery. The above dielectric sheet 10A is made of a well-known material such as a glass epoxy employed for a printed substrate in the electronic industry, or ceramics such as alumina.

The adjoining dielectric sheet 10B has the same configuration as the dielectric sheet 10A and has the refractive-index distribution body 11B including the core 12B and the periphery 13B in a through hole 10B1. In each refractive-index distribution body 11A, 11B of the adjoining dielectric sheets 10A and 10B, the large-diameter end face of one core and the small-diameter end face of the other core face each other and optically couple together. In FIG. 1, a large-diameter end face 12B1 of the core 12B in the dielectric sheet 10B is opposite to the small-diameter end face 12A2 of the core 12A in the dielectric sheet 10A and is optically coupled onto it. In the several laminated dielectric sheets, every connection part of two adjoining layers has the same positional relationship between a large-diameter end face and a small-diameter end face in the axial direction: the truncated conical core of each refractive-index distribution body is equally oriented.

The cores of the adjacent refractive-index distribution bodies optically couple together to connect the refractive-index distribution bodies 11A, 11B . . . of all the dielectric sheets 10A, 10B . . . constituting the substrate 2 one after another, thereby forming the optical transmission body 3 penetrating the substrate 2 from one surface 2a up to the other surface 2b. Therefore, the optical transmission body 3 penetrating the substrate 2 can be formed by laminating dielectric sheets equivalent to a suitable layer number regardless of a thickness of the substrate 2. In the optical transmission substrate 1 of FIG. 1, every core of the refractive-index distribution bodies in the dielectric sheets is coaxially arranged (including a dispersion equivalent to the tolerances due to the truncated conical cores) and optically couple together, thereby making the optical transmission body 3 perpendicular to the surfaces 2a and 2b of the substrate 2.

The optical transmission substrate 1 shown in FIG. 1 according to one embodiment of the present invention has advantages as follows. Although the adjacent dielectric sheets 10A and 10B and the refractive-index distribution bodies 11A and 11B thereof is illustrated, the same is applied to any two adjacent dielectric sheets in layers of the substrate 2 and the refractive-index distribution bodies thereof. In the refractive-index distribution body 11A (the same as the refractive-index distribution body 11B), light propagates with shut up in the core 12A to thereby basically reduce the propagation loss. The refractive-index distribution body 11A provided with the core 12A can be excellently formed by forming the core 12A before laminating the dielectric sheet 10A in a fabrication process (a fabrication method will be detailed in FIG. 3). For example, if the core of each dielectric sheet is formed after forming the substrate 2 by laminating a plurality of the dielectric sheet 10A and the others, as is the case with Japanese Patent Laid-Open Publication No. 2004-279687, then the substrate 2 may be so thick that the difference in width between the large-diameter end face and small-diameter end face of the core excessively increases, or either end face fails to be formed. This makes it impossible to obtain the optical transmission body 3 penetrating the substrate 2 and having excellent propagation characteristics.

In addition, the small-diameter end face 12A2 of the core 12A of the refractive-index distribution body 11A is opposite to and optically coupled with the large-diameter end face 12B1 of the core 12B of the refractive-index distribution body 11B. The large-diameter end face 12B1 is wider than the small-diameter end face 12A2, and thereby relaxes the optical-coupling tolerance (allowance) at the connection part of the core 12A and the core 12B to a positional difference of the lamination of the dielectric sheet 10A and the dielectric sheet 10B. Even if the cores shift from each other at the connection part, a propagation loss can be suppressed, and simultaneously, uniform propagation characteristics can be realized among those. This is because the core of each refractive-index distribution body has a truncated conical shape with the large-diameter end face and the small-diameter end face.

The plurality of refractive-index distribution bodies provided with the cores having excellent propagation characteristics are connected by relaxed-tolerance optical-coupling, and whereby the optical transmission body 3 having excellent propagation characteristics can be obtained.

However, if the difference in width between the small-diameter end face 12A2 and the large-diameter end face 12B1 is too large, the loss increases sharply at the connection part of the core 12A and the core 12B. Therefore, it is preferable to set the thickness of each dielectric sheet 10A, 10B to a suitable value and set the difference in width between the large-diameter end face 12A1 and the small-diameter end face 12A2 to a suitable value by forming the core 12A under an appropriate exposure and development conditions. As an example, if the thickness of the dielectric sheet 10A is 500 μm, the diameter of a large-diameter end face and the diameter of a small-diameter end face are preferably set to 200 μm and 150 μm, respectively.

FIG. 2 is a schematic sectional view showing the main part of another exemplary optical transmission substrate according to one embodiment of the present invention. An optical transmission substrate 1 in another example shown in FIG. 2 has the same configuration of each dielectric sheet 10A, 10B . . . constituting the substrate 2 as the dielectric sheets of the optical transmission substrate 1 shown in FIG. 1, however, is different in the lamination form of each dielectric sheet. In the optical transmission substrate 1 of FIG. 1, the optical transmission body 3 formed in the substrate 2 is perpendicular to the surfaces 2a and 2b of the substrate 2, while the optical transmission body 3 formed in the substrate 2 inclines from the direction perpendicular to the surfaces 2a and 2b of the substrate 2 in the optical transmission substrate 1 of FIG. 2. For example, the adjoining dielectric sheets 10A and 10B are laminated by shifting the axis of each refractive-index distribution body 11A, 11B, in other words, the core 12A of the refractive-index distribution body 11A is not coaxially arranged with but shifts from the axis of the core 12B of the refractive-index distribution body 11B. The thus properly shifted core 12A and 12B allows a part of the periphery of the small-diameter end face 12A2 of the core 12A to overlap almost with a part of the periphery of the large-diameter end face 12B1 of the core 12B. In any two adjacent dielectric sheets in layers of the substrate 2, the cores are laminated by shifting by the same distance in the same direction at the connection part, thereby as shown in the figure, forming the optical transmission body 3 inclined by a predetermined angle with respect to the surfaces 2a and 2b of the substrate 2. This is feasible because the core of each refractive-index distribution body is a truncated cone having a large-diameter end face and a small-diameter end face.

The optical transmission substrate 1 of FIG. 2 is capable of inclining the optical transmission body 3 penetrating the substrate 2 in a desirable direction, and whereby the optical line can be designed more freely inside of the substrate 2. As shown in FIG. 2, each refractive-index distribution body shifts smoothly from an X1 side to an X2 side, and thereby making it possible to lead light to be incident from the X1 side and emitted to the X2 side, and vice versa. This allows even light given a limit to the incidence or emission direction upon or to the substrate 2 to propagate at an angle as close as possible through the substrate 2, and thereby reducing the propagation loss in the incidence or emission part and thus further decreasing the total propagation loss.

FIGS. 3A to 3E are schematic sectional views showing the main part in each process of an example of a method for fabricating the optical transmission substrate of FIG. 1 or 2 according to one embodiment. FIGS. 3A to 3E show the fabrication method for the dielectric sheet of each layer in the multi-layer optical transmission substrate. A plurality of the dielectric sheets formed in this fabrication method are laminated in a well-known junction method, and thereby the optical transmission substrate according to one of the present invention can be obtained.

Figure 3A:
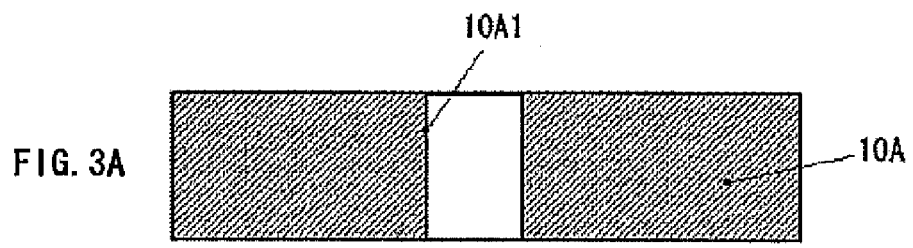
FIGS. 3A to 3E are schematic sectional views showing the main part in each process of an exemplary method for fabricating the optical transmission substrate shown in FIG. 1 according to one embodiment of the present invention.

First, as shown in FIG. 3A, the through hole 10A1 penetrating the dielectric sheet 10A is formed, for example, by drilling, laser machining or the like, alternatively, by metal-molding.

Figure 3B:
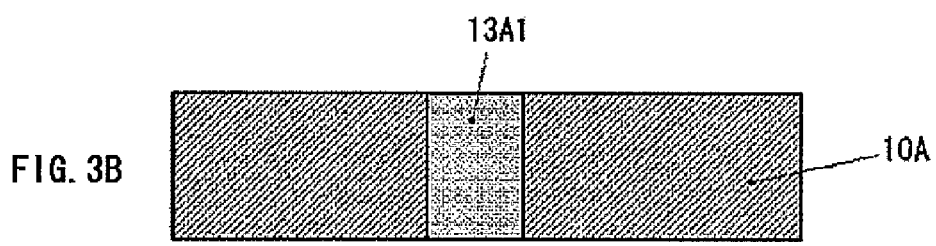

Next, as shown in FIG. 3B, the through hole 10A1 is filled with a first photosensitive polymeric material 13A1 which is liquid and forms the periphery of a completed refractive-index distribution body. This filling is conducted in a syringe-injection or vacuum-suction method. The first photosensitive polymeric material 13A1 is filled into the through hole 10A1 in such a way that it does not overflow from the through hole 10A1 or does not be in short supply by bringing the upper and lower end faces onto substantially the same plane with the upper and lower surfaces of the dielectric sheet 10A.

Sequentially, it is heated for several minutes at approximately 100° C. through a so-called pre-bake where the first photosensitive polymeric material 13A1 reacts, hardens and solidifies from the liquid state.

Figure 3C:
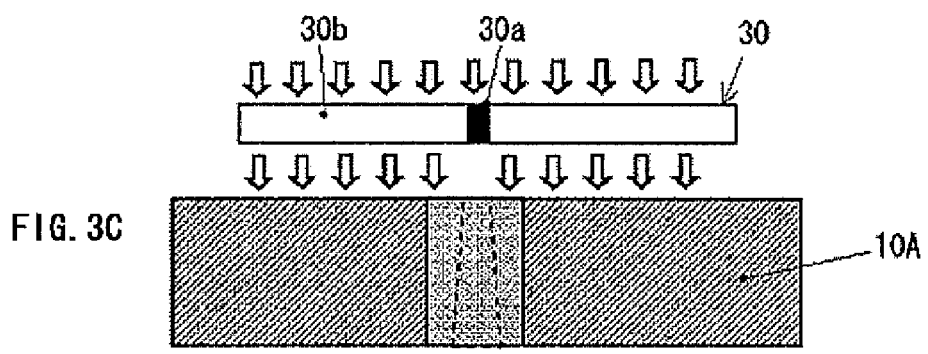

Next, as shown in FIG. 3C, ultraviolet rays irradiate the dielectric sheet 10A perpendicularly through the photo mask 30, and thereby the first photosensitive polymeric material 13A1 is exposed. The photo mask 30 includes, for example, a circular light shielding section 30a as a mask pattern having a smaller diameter than the through hole 10A1, and a light transmission section 30b. The light shielding section 30a is the mask pattern corresponding to a central area of a completed refractive-index distribution body.

Figure 3D:
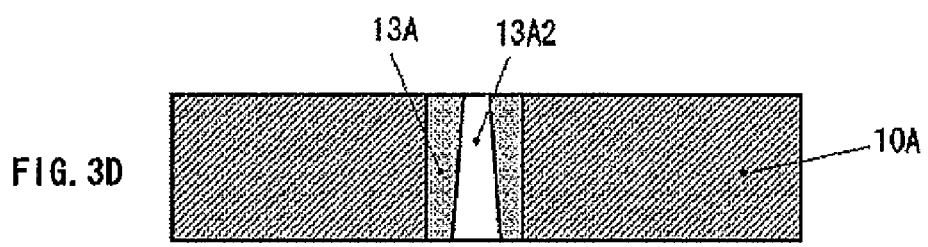

The filled first photosensitive polymeric material 13A1 is developed after exposed to ultraviolet rays, thereby as shown in FIG. 3D, forming the through hole 13A2 in the central area thereof other than the periphery 13A receiving ultraviolet rays.

Figure 3E:
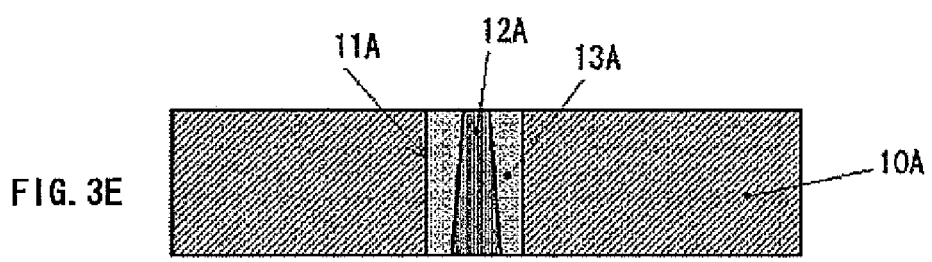

Lastly, as shown in FIG. 3E, the through hole 13A2 is filled with a second photosensitive polymeric material forming the core 12A, and thereafter, the whole thereof is heated for tens minutes at approximately 100° C. through a so-called post-bake. The second photosensitive polymeric material has a higher refractive index than the first photosensitive polymeric material. In the post-bake, the entire photosensitive polymeric material of each of the core 12A and the periphery 13A continues to harden into the refractive-index distribution body 11A hard enough and having stable characteristics with a stepwise refractive-index distribution.

The fabrication method of FIG. 3 is capable of forming many refractive-index distribution bodies all at once in the dielectric sheet 10A.

FIGS. 4A to 4B show the exposure and development of FIGS. 3C and 3D in further detail, illustrating the exposure and development of, for example, a negative photosensitive acrylic resin as the first photosensitive polymeric material. FIG. 4A is a schematic sectional view showing an exposure intensity distribution inside of the through hole 10A1 when it is exposed to ultraviolet rays while masking the central area of the through hole 10A1 with the photo mask 30 in FIG. 3C. If the through hole 10A1 is exposed from one end thereof to ultraviolet rays, the exposure intensity becomes gradually feebler through absorption from the exposure side toward the opposite side in the area directly under the light shielding section 30a. Hence, the exposure intensity becomes weaker in a position closer to the opening on the opposite side, thereby making it easier to develop even the area directly under the light transmission section 30b. Therefore, if the thus exposed photosensitive acrylic resin is developed, as shown in FIG. 4B, the through hole 13A1 formed in the exposed photosensitive acrylic resin widens on the side opposite to the exposure side. The core 12A made of a material having a higher refractive index than the first photosensitive polymeric material is in the through hole 13A1, and thereby being shaped into a truncated cone having a large-diameter end face and a small-diameter end face and having a higher refractive index in the radial direction than on the periphery 13A.

Alternatively, a positive photosensitive polymeric resin may be employed and the light shielding section 30a and the light transmission section 30b of the photo mask 30 may be inverted to conduct an exposure, and thereby a through hole narrowing toward the side opposite to the exposure side can be formed. This makes it possible to form a core shaped like a truncated cone having a large-diameter end face and a small-diameter end face.

As another example, a refractive-index distribution body can be made of a photosensitive polymeric material, such as a polysilane polymer resin producing a photo-bleaching phenomenon where the refractive index drops upon receiving light and a photosensitive acrylic resin or epoxy resin having the property of raising the refractive index in a part thereof upon receiving light. In this case, ultraviolet rays within the ultraviolet wavelength range irradiate a through hole from one end thereof, and thereby the exposure intensity is weaken toward the other end. As a result, a truncated conical core can be formed.

As shown in FIGS. 3 and 4, the optical-transmission substrate fabrication method according to the present invention includes: filling a through hole of a dielectric sheet with a photosensitive polymeric material; forming a truncated conical core in the photosensitive polymeric material to form a cylindrical refractive-index distribution body, the truncated conical core having a higher refractive index in the radial direction than the periphery; and laminating a plurality of the dielectric sheets, each of which has the refractive-index distribution body formed therein.

The optical-transmission substrate fabrication method according to one of the present invention shown in FIGS. 3 and 4 has the above configuration. In the substrate set to a predetermined thickness, the layer number of dielectric sheets, in other words, the thickness of a single dielectric sheet is suitably set, thereby making it possible to excellently form a core of a refractive-index distribution body in each dielectric sheet. At this time, the end faces of the core have different diameters at the upper and lower ends of the through hole, and thereby the diameter of one core of adjoining refractive-index distribution bodies is wider than the other in the laminated dielectric sheets. Accordingly, even if a dielectric sheet is laminated to be shifted from a predetermined position, the core (large-diameter end face) having a wider diameter than the narrow core (small-diameter end face) relaxes the optical-coupling tolerance to the positional shift, thereby suppressing a propagation loss of signal light. This makes it possible to fabricate the optical transmission substrate sustaining less propagation loss and having uniform propagation characteristics among such sheets.

FIG. 5 is a schematic sectional view showing the main part of another exemplary optical transmission substrate according to one embodiment of the present invention. The optical transmission substrate of FIG. 5 further includes, in the optical transmission substrate of FIG. 1, for example, a concave formed in each end part of the refractive-index distribution body 11A of the dielectric sheet 10A and translucent members 14A1 and 14A2 filled into the concaves. The end surface of the translucent member 14A2 of the laminated dielectric sheet 10A and the end surface of a translucent member 14B1 of the dielectric sheet 10B are in contact with each other at the connection part.

The exemplary optical-transmission substrate fabrication method shown in FIG. 5 further includes forming a concave in each end part of the first photosensitive polymeric material 13A1 filled into the through hole 10A in FIG. 3B; and filling the concave with the translucent members 14A1 and 14A2 after forming the refractive-index distribution body 11A in FIG. 3E. in addition to the optical-transmission substrate fabrication method of FIG. 3. In order to form the concave in an end part of the first photosensitive polymeric material 13A1, in addition to the process of FIG. 3B, heating and hardening may be further conducted after filling the first photosensitive polymeric material 13A1 as flat as possible into an end part of the through hole 10A1, thereby thermally shrink the first photosensitive polymeric material 13A1 to form the concave in the end part.

The optical transmission substrate 1 of FIG. 5 has the following advantages. Although the adjacent dielectric sheets 10A and 10B and the refractive-index distribution bodies 11A and 11B thereof is illustrated, the same is applied to any two adjacent dielectric sheets in layers of the substrate 2 and the refractive-index distribution bodies thereof. A space is formed between the end of the core 12A of the adjoining refractive-index distribution body 11A and the core 12B of the refractive-index distribution body 11B, thereby further relaxing the optical-coupling tolerance to a lamination shift in the cores 12A and 12B.

In addition, even if there is a space between each end of the cores 12A and 12B, the filled translucent members 14A2 and 14B1 suppress a reflection of signal light by each end of the cores 12A and 12B. In this respect, preferably, a translucent member has a refractive index equal to that of a core. Besides, the translucent members 14A2 and 14B1 keep the unstable concave shape from making the optical characteristics uneven, thereby securing the stability of signal-light propagation characteristics regardless of the concave. This makes it possible to further suppress a propagation loss and further unify the propagation characteristics among such sheets.

Alternatively, the concave may remain a cavity, and thereby the optical-coupling tolerance to a positional shift in adjacent cores can be relaxed in the same way.

FIG. 6 is a schematic sectional view showing the main part of still another exemplary optical transmission substrate according to one embodiment of the present invention. The optical transmission substrate 1 of FIG. 6 further includes optical waveguides 4A and 4B formed on both surfaces 2a and 2b of the substrate 2 in the optical transmission substrate of FIG. 2. The optical waveguides 4A and 4B may be further formed in the optical transmission substrate of FIG. 1.

In the optical transmission substrate 1 of FIG. 6, the optical transmission body 3 penetrating the substrate 2 and the optical waveguide 4A optically couple together via the optical-path converter 5A provided at an end of the optical waveguide 4A. Specifically, the core 12A of the refractive-index distribution body 11A in the outermost dielectric sheet 10A forming the one surface 2a of the substrate 2 is optically coupled onto the optical waveguide 4A through the optical-path converter 5A.

Similarly, the optical transmission body 3 and the optical waveguide 4B optically couple together via the optical-path converter 5B provided at an end of the optical waveguide 413. Specifically, the core 12N of the refractive-index distribution body 11N of the outermost dielectric sheet 10N forming the other surface 2b of the substrate 2 is optically coupled onto the optical waveguide 4B through the optical-path converter 5B.

The optical waveguide 4A includes the core 4A2, and the upper clad 4A1 and the lower clad 4A3, both clads enclosing the core 4A2. The optical-path converter 5A includes the base 5A1 made of a translucent member and the reflection plane (optical-path conversion plane) 5A2 formed in the base 5A1. The reflection plane 5A2 is coated with a metal film having a high reflectance in the signal-light wavelength, for example, gold (Au), silver (Ag) or aluminum (Al) at a wavelength of 600 to 1500 nm. The reflection plane 5A2 is placed at an angle suitable for turning the optical path from the optical transmission direction (parallel to the substrate) in the optical waveguide 4A to the optical transmission direction (slightly inclining from the direction perpendicular to the substrate) in the optical transmission body 3.

The optical transmission substrate 1 of FIG. 6 has advantages as follows. The optical transmission body 3 penetrating the substrate 2 connects the optical waveguide 4A formed on the one surface 2a of the substrate 2 and the optical waveguide 4B formed on the other surface 2b optically with excellent and uniform propagation characteristics, thereby realizing an excellent optical transmission between the optical waveguides 4A and 4B of the one surface 2a and the other surface 2b.

FIG. 7 is a schematic sectional view showing the main part of an exemplary composite optoelectronic substrate provided with the optical transmission substrate according to one embodiment of the present invention. A composite optical transmission substrate 100 of FIG. 7 includes the substrate 2 of the optical transmission substrate 1 shown in FIG. 2 and a second substrate 41 parallel to the substrate 2. In the practical example, if electric line is provided on the substrate 2 as a daughter board and the second substrate 41 as a mother board, both electrically connect via a suitable soldering connection part (not shown). In another example, the substrate 2 and the second substrate 41 may be a mother board and a daughter board, respectively. Alternatively, the optical transmission substrate of FIG. 2 may be replaced by the composite optical transmission substrate shown in FIG. 7 which is constituted by using the optical transmission substrate of FIG. 1.

An optical waveguide 4D is formed on a surface 42a of the second substrate 41 facing the substrate 2. The optical transmission body 3 formed in the substrate 2 and an optical waveguide 4D formed on the second substrate 41 optically couple together via an optical-path converter SD provided at an end of the optical waveguide 4D. Specifically, the core 12N of the refractive-index distribution body of the outermost dielectric sheet 10N forming the other surface 2b of the substrate 2 is optically coupled onto the optical waveguide 4D through the optical-path converter 5D.

The optical waveguide 4D includes a core, and an upper clad and a lower clad both clads enclosing the core. The optical-path converter SD includes a reflection plane (optical-path conversion plane) 5D2 formed in the base thereof. The reflection plane 5D2 is coated with a metal film having a high reflectance in the signal-light wavelength, for example, gold (Au), silver (Au) or aluminum (Al) at a wavelength of 600 to 1500 nm. The reflection plane 5D2 is placed at an angle suitable for turning the optical path from the optical transmission direction (parallel to the substrate) in the optical waveguide 4D to the optical transmission direction (slightly inclining from the direction perpendicular to the substrate) in the optical transmission body 3.

The composite optical transmission substrate of FIG. 7 is created, for example, in the following method.

In a first process, the optical waveguide 4D is formed on the one surface 42a of the second substrate 42 (e.g., mother board). In a second process, a refractive-index distribution body is formed in the substrate 2 (e.g., daughter board) of the optical transmission substrate 1. The first and second processes can be independently conducted irrespective of the order. In a third process, proper optical devices are mounted on the substrate 2. In the last fourth process, the substrate 2 is placed on the second substrate 42.

FIG. 8 is a schematic sectional view showing the main part of an exemplary optoelectronic hybrid substrate according to one embodiment of the present invention. An optoelectronic hybrid substrate 20 according to one of the present invention shown in FIG. 8 is a two-layer substrate which is a combination of any one of the optical transmission substrates 1 shown in FIGS. 1 to 5 and a second substrate 1A. The two-layer substrate includes: first conductor patterns 7a and 7b formed on the surface thereof on the side of the optical transmission substrate 1; a second conductor pattern 7c formed on the surface thereof on the side of the second substrate 1A; a penetrating conductor 7d penetrating the two-layer substrate 20 and connecting the first conductor pattern 7b and the second conductor pattern 7c; an optical semiconductor device 8 electrically connected to the first conductor patterns 7a and 7b on the surface on the side of the optical transmission substrate 1; and an optical waveguide 4C formed between the optical transmission substrate 1 and the second substrate 1A. The core 12A of the refractive-index distribution body in the outermost dielectric sheet 10A forming the surface of the two-layer substrate 20 on the side of the optical transmission substrate 1 is optically coupled onto the optical semiconductor device 8, and the core 12N of the refractive-index distribution body in the dielectric sheet 10N forming the surface of the optical transmission substrate 1 on the side of the optical waveguide 4c is optically coupled onto the optical waveguide 4C.

Figure 9:
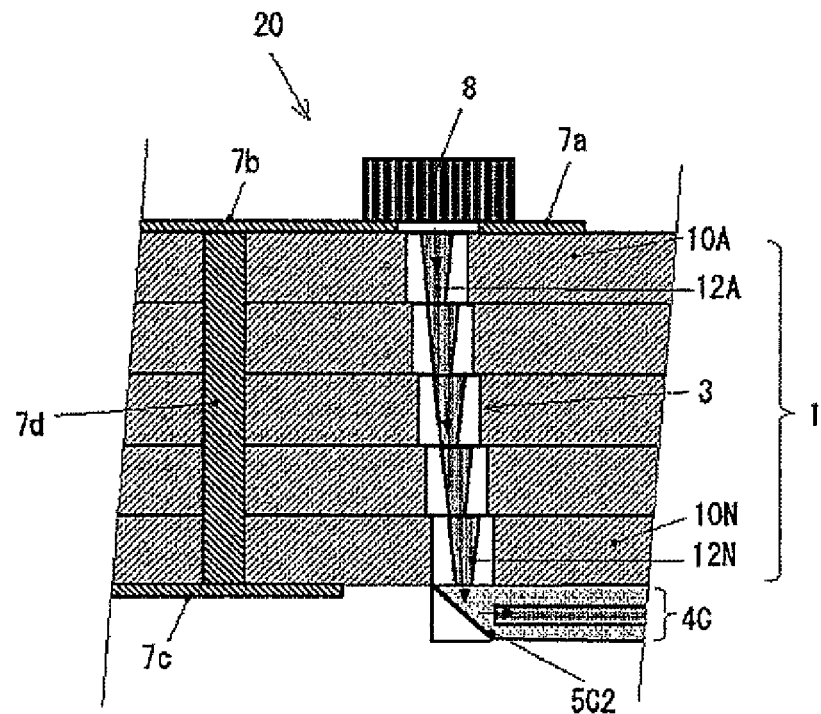
FIG. 9 is a schematic sectional view showing the main part of another exemplary optoelectronic hybrid substrate according to one embodiment of the present invention.
Figure 10:
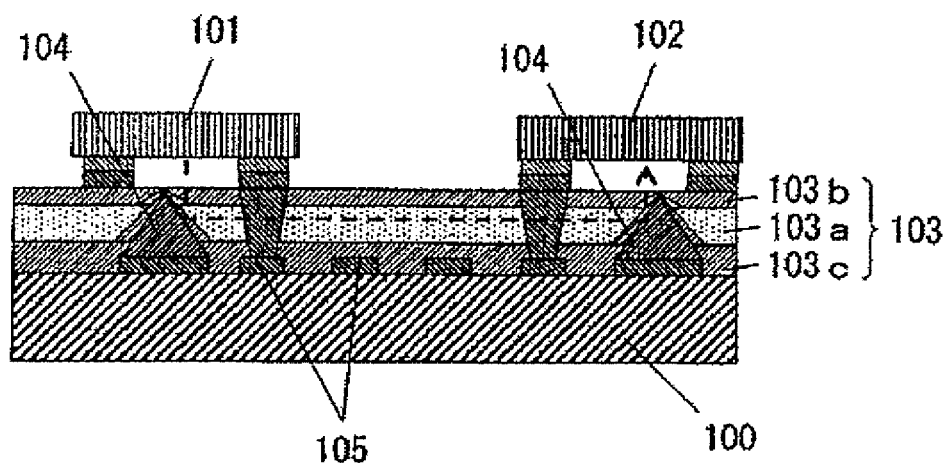
FIG. 10 is a sectional view showing an example of a conventional optical transmission substrate.

FIG. 9 is a schematic sectional view showing the main part of another exemplary optoelectronic hybrid substrate according to one embodiment of the present invention. The optoelectronic hybrid substrate 20 according to the present invention shown in FIG. 9 includes: the first conductor patterns 7a and 7b formed on one surface of the optical transmission substrate 1 according to one of the present invention shown in FIGS. 1 to 5; the second conductor pattern 7c formed on the other surface thereof; the penetrating conductor 7d penetrating the optical transmission substrate 1 and connecting the first conductor pattern 7b and the second conductor pattern 7c; the optical semiconductor device 8 electrically connected to the first conductor patterns 7a and 7b on the one surface of the optical transmission substrate 1; and the optical waveguide 4C formed on the other surface of the optical transmission substrate 1. The core 12A of the refractive-index distribution body in the outermost dielectric sheet 10A forming the one surface of the optical transmission substrate 1 is optically coupled onto the optical semiconductor device 8, and the core 12N of the refractive-index distribution body in the dielectric sheet 10N forming the other surface of the optical transmission substrate 1 is optically coupled onto the optical waveguide 4C.

In the optoelectronic hybrid substrate 20 having the configuration of FIG. 8 or 9, in further detail, the optical semiconductor device 8 is a light-emitting device such as a semiconductor laser and a light-emitting diode or a light-receiving device such as a photo-diode (in this example, a light-emitting device). The optical semiconductor device 8 is placed on the first conductor patterns 7a and 7b formed on the optical transmission substrate 1 in such a way that a light-emission point (not shown) thereof as an active region is oriented toward the optical transmission substrate 1, and electrodes (not shown) thereof are joined to the first conductor patterns 7a and 7b using a junction material such as a soldering alloy or a conductive adhesive. The optical semiconductor device 8 is precisely set at a predetermined position using an image processing apparatus or the like in such a way that the electrodes are joined to the first conductor patterns 7a and 7b and the light-emission point is optically coupled onto an optical-path conversion plane 5C2 through the optical transmission body 3.

Through the conductor patterns 7a and 7b, the optical semiconductor device 8 is given an electric current in the ordinary direction from the anode electrode to the cathode electrode thereof, and thereby light from the active region of an optical semiconductor device 10 as a light-emitting device is emitted.

The optical transmission substrate 1 forming the upper part of the optoelectronic hybrid substrate 20 is provided with the core 12A of the refractive-index distribution body in the outermost dielectric sheet 10A in a position facing the light-emission point of the optical semiconductor device 8. The optical transmission body 3 formed by connecting the refractive-index distribution bodies penetrate the optical transmission substrate 1 between the light-emission point of the optical semiconductor device 8 and the optical-path conversion plane 5C2. The refractive-index distribution body of each dielectric sheet has a diameter far larger than the S size of the light-emission point of the optical semiconductor device 8 and the light emitted from there and also has a size large enough to manage the optical-path conversion plane 5C2.

The optical semiconductor device 8 of the surface-receiving type has a reverse signal-light optical path: signal light propagating through the optical waveguide 4C is emitted from the core thereof, reflected and turned by the optical-path conversion plane 5C2, incident upon the optical transmission body 3 and received by the active region of the surface-receiving device 8 such as a surface-receiving photo-diode.

If the optical semiconductor device 10 is a surface-emitting laser diode or a surface-receiving photo-diode, the optoelectronic hybrid substrate 20 according to one of the present invention is capable of easily forming optical coupling only by mounting the devices on the substrate in such a way that the active regions thereof face, thereby realizing an efficient optical-coupling structure easily without any special component device.

As an another application of the optoelectronic hybrid substrate 20 of FIG. 8 or 9, an optical semiconductor device of the surface-emitting type and an optical semiconductor device of the surface-receiving type may be mounted and fixed on one surface of the optical transmission substrate 1, the optical transmission body 3 corresponding to each optical semiconductor device may be formed inside of the optical transmission substrate 1, and optical coupling can be obtained via an optical waveguide provided on the other surface of the optical transmission substrate 1. This makes it possible to transmit an optical signal excellently in the optical transmission substrate 1.

In the exemplary optoelectronic hybrid substrate according to one embodiment of the present invention shown in FIG. 8 or 9, the optical transmission substrate 1 is capable of conducting an excellent optical transmission with a small loss between the one surface 2a and the other surface 2b, thereby improving the reception level on the reception side and thus obtaining excellent information access at high speed and at a low error rate between the optical semiconductor devices, or suppressing the transmission level on the transmission side, reducing the electric current for driving the optical semiconductor device to generate less heat and thus enhancing the reliability.

The present invention is not limited to the examples of the above embodiment. Numerous variations which are not illustrated can be expected without departing from the scope of the present invention.

What is claimed is:

1. An optical transmission substrate, comprising:
a substrate formed by laminating a plurality of dielectric sheets; and
a plurality of cylindrical refractive-index distribution bodies, each of which is made of a photosensitive polymeric material in a cylindrical through hole penetrating each of the dielectric sheets, each of the cylindrical refractive-index distribution bodies including a truncated conical core and a periphery, the core having a higher refractive index in the radial direction than the periphery and having a large-diameter end face and a small-diameter end face,
wherein the cores of the refractive-index distribution bodies have a first core and a second core in two adjoining dielectric sheets, and the large-diameter end face of the first core and the small-diameter end face of the second core face each other and optically couple together.

2. The optical transmission substrate according to claim 1, wherein the refractive index changes stepwise on the boundary between the core and the periphery in the radial direction.

3. The optical transmission substrate according to claim 1, wherein the refractive index in the core gradually lowers concentrically outward in the radial direction from the center.

4. The optical transmission substrate according to claim 1, further comprising concave receding into the through hole from the opening edge of the through hole at an end part of the refractive-index distribution body, the concave having a translucent member therein.

5. The optical transmission substrate according to claim 4, wherein each of the two concaves is formed in each of two adjoining dielectric sheets respectively, and both of the end surfaces of the translucent members in the two concaves are contact with each other at the connection part.

6. The optical transmission substrate according to claim 4, wherein 1 refractive-index of the translucent member is the same as that of the truncated conical core.

7. The optical transmission substrate according to claim 1, further comprising an optical waveguide formed on one surface of the substrate, the optical waveguide being optically coupled with the core of the refractive-index distribution body in the dielectric sheet forming the one surface.

8. An optoelectronic hybrid substrate, comprising:
the optical transmission substrate according to claim 1;
a first conductor pattern formed on a first surface of the optical transmission substrate;
a second conductor pattern formed on a second surface of the optical transmission substrate;
a penetrating conductor through the substrate, connecting the first conductor pattern and the second conductor pattern;
an optical semiconductor device electrically connected to the first conductor pattern on the one surface; and
an optical waveguide formed on the second surface, wherein:
the core of the refractive-index distribution body in the dielectric sheet forming the first surface is optically coupled onto the optical semiconductor device; and the core of the refractive-index distribution body in the dielectric sheet forming the second surface is optically coupled onto the optical waveguide.

9. An optoelectronic hybrid substrate, comprising:
a two-layer substrate which is a lamination of the optical transmission substrate according to claim 1 and a second substrate; and
a first conductor pattern formed on a first surface of the optical transmission substrate in the two-layer substrate,
a second conductor pattern formed on a first surface of the second substrate in the two-layer substrate,
a penetrating conductor through the two-layer substrate, connecting the first conductor pattern and the second conductor pattern,
an optical semiconductor device electrically connected to the first conductor pattern on the first surface of the optical transmission substrate, and
an optical waveguide formed between the optical transmission substrate and the second substrate, wherein:
the core of the refractive-index distribution body in the dielectric sheet forming the first surface of the optical transmission substrate in two-layer substrate is optically coupled onto the optical semiconductor device; and
the core of the refractive-index distribution body in the dielectric sheet forming a second surface of the optical transmission substrate on which the optical waveguide is formed is optically coupled onto the optical waveguide.

10. A composite optical transmission substrate, comprising:
the optical transmission substrate according to claim 1;
a second substrate parallel to the optical transmission substrate; and an optical waveguide formed on the surface of the second substrate facing the optical transmission substrate,
wherein the core of the refractive-index distribution body in the dielectric sheet of the optical transmission substrate facing the second substrate is optically coupled onto the optical waveguide.

11. An optical-transmission substrate fabrication method, comprising:
filling a cylindrical through hole formed in a dielectric sheet with a photosensitive polymeric material;
forming a truncated conical core and a periphery in the photosensitive polymeric material to form a cylindrical refractive-index distribution body, the truncated conical core having a higher refractive index in the radial direction than the periphery; and
laminating a plurality of the dielectric sheets, each of which has the refractive-index distribution body formed therein.

12. The optical-transmission substrate fabrication method according to claim 11, further comprising:
forming a concave in an end part of the photosensitive polymeric material filled into the through hole; and
filling the concave with a translucent member after forming the refractive-index distribution body.

13. An optical transmission substrate, comprising:
a substrate formed by laminating a plurality of dielectric sheets, each dielectric sheet comprises a through hole penetrating therethrough; and
a plurality of cylindrical refractive-index distribution bodies made of a photosensitive polymeric material, each of which is formed in through hole and comprises a core and a periphery around the core, the core having a higher refractive index in the radial direction than the periphery and having a truncated conical shape with a large-diameter end face and a small-diameter end face,
wherein the cores of the refractive-index distribution bodies have a first core and a second core in two adjoining dielectric sheets respectively, and the large-diameter end face of the first core and the small-diameter end face of the second core face each other and optically couple together.

* * * * *